N. L. SIMPSON.
MUSICAL TABLATURE FOR FIFES.
APPLICATION FILED OCT. 31, 1919.
1,390,933. Patented Sept. 13, 1921.
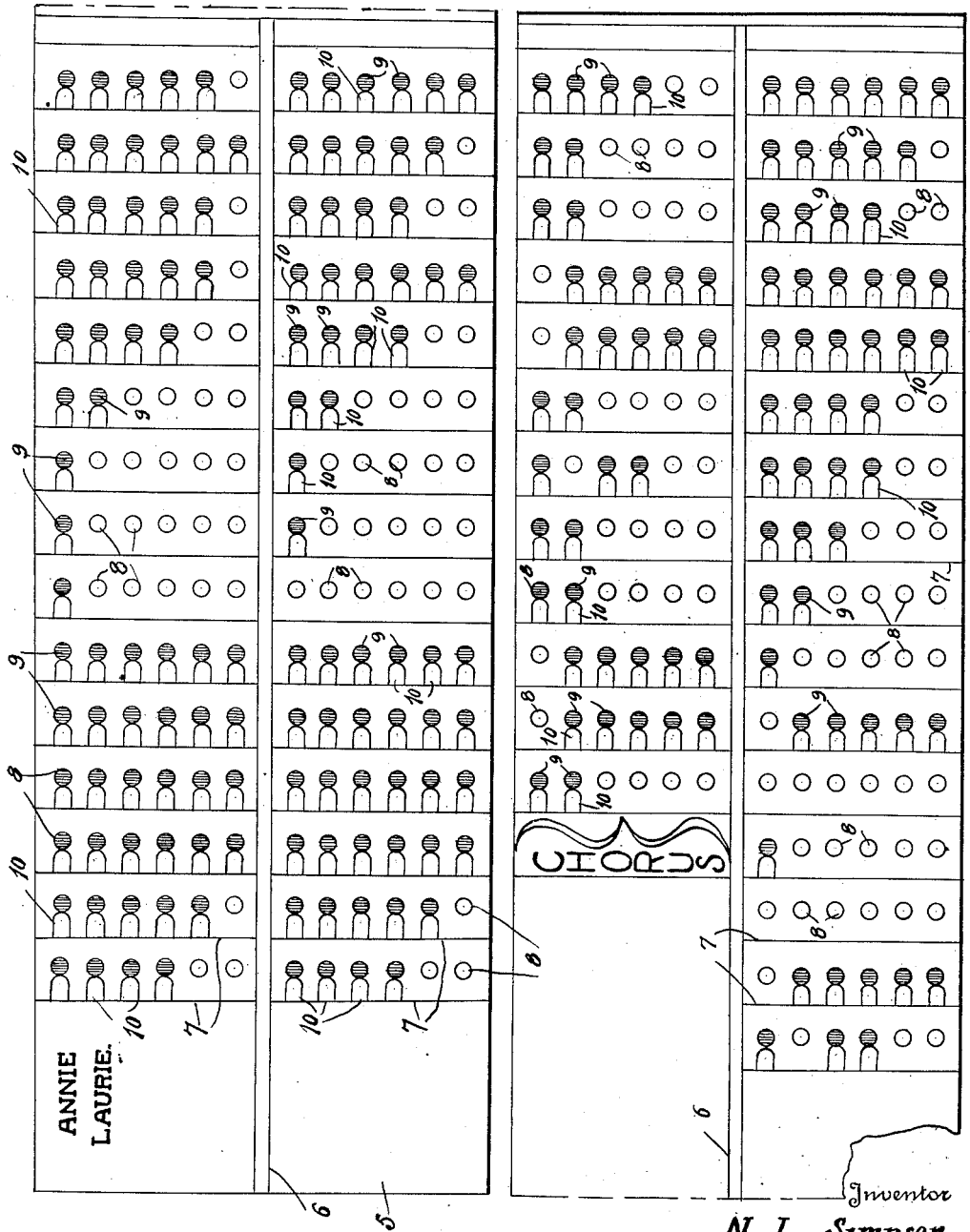

UNITED STATES PATENT OFFICE.

NELSON L. SIMPSON, OF CORONA, NEW YORK.

MUSICAL TABLATURE FOR FIFES.

1,390,933.   Specification of Letters Patent.   Patented Sept. 13, 1921.

Application filed October 31, 1919. Serial No. 334,796.

*To all whom it may concern:*

Be it known that I, NELSON LOUIS SIMPSON, a citizen of the United States, residing at Corona, Long Island, in the county of Queens and State of New York, have invented certain new and useful Improvements in Musical Tablatures for Fifes; and I do hereby declare the following to be a full, clear, and exact description of the invention, such as will enable others skilled in the art to which it appertains to make and use the same.

This invention has for its object to provide an improved chart by the aid of which a person inexperienced in the use of musical instruments may quickly and easily learn to play various melodies upon the fife.

With this and other objects in view, the invention consists in the novel construction, combination and arrangement of parts as will be hereinafter specifically described, claimed and illustrated in the accompanying drawing, in which:

The figure represents a plan view, in halves, of the chart.

Referring to the drawing in detail, the numeral 5 indicates the chart, which is formed of a relatively long narrow sheet of paper, or other suitable material in sheet form, which is divided longitudinally by centrally located and longitudinally extending double lines 6. The double lines 6 are intercepted at regular intervals by a series of transverse lines 7, extending outwardly to the longitudinal edges of the sheet.

The longitudinal and transverse lines 6 and 7 divide the front surface of the sheet into a series of vertically disposed spaces in which are printed, or otherwise marked, six circles 8 representing the six holes or ports in a fife. The six circles composing each vertical row are preferably arranged in vertical line and at equal distances apart for convenience in reference and to eliminate confusion in reading the chart.

In order to indicate the holes or ports of the fife which should be closed in order to produce the various notes of a musical composition, the circles 8 representing the holes to be covered are filled in with red or other coloring matter, as suggested by the shading in the accompanying drawing, and to further assist in reading the chart those circles representing the covered ports are designated by characters 10, which are substantially U-shaped and resemble the tip of the finger.

From the foregoing it is evident that an experienced musician may readily lay off the chart in order to assist inexperienced persons in playing various musical compositions by preliminarily fingering the composition upon the fife and during the progress of the execution of the composition marking the chart to indicate which holes or ports of the fife are to be covered to produce the various tones essential to a reproduction of the melody of the composition.

Once the chart is prepared for use, it is a simple matter for the novice to read and follow it in playing the musical composition.

What I claim as new is:—

A chart having characters thereon in rows with the characters of each row representing the holes or ports in a musical instrument and means associated with the characters to designate those to be covered, consisting of finger representations disposed opposite said characters and in rows, the arrangement thus indicating in rows all holes to be covered at each blowing of the instrument and for successive blowings to render a complete musical selection without the study of notes.

In testimony whereof I affix my signature in presence of two witnesses.

NELSON L. SIMPSON.

Witnesses:
JOSEPHINE SIMPSON,
HARRY BUFFMAN.